(12) United States Patent
Hastings

(10) Patent No.: US 9,197,628 B1
(45) Date of Patent: Nov. 24, 2015

(54) DATA LEAK PROTECTION IN UPPER LAYER PROTOCOLS

(71) Applicant: Fortinet, Inc., Sunnyvale, CA (US)

(72) Inventor: Eric C. Hastings, Austin, TX (US)

(73) Assignee: Fortinet, Inc., Sunnyvale, CA (US)

( * ) Notice: Subject to any disclaimer, the term of this patent is extended or adjusted under 35 U.S.C. 154(b) by 0 days.

(21) Appl. No.: 14/657,735

(22) Filed: Mar. 13, 2015

Related U.S. Application Data

(63) Continuation of application No. 14/482,986, filed on Sep. 10, 2014.

(51) Int. Cl.
*H04L 29/06* (2006.01)

(52) U.S. Cl.
CPC .............. *H04L 63/08* (2013.01); *H04L 63/1408* (2013.01)

(58) Field of Classification Search
CPC ............................. H04L 63/08; H04L 63/1408
USPC ........................................ 713/153; 726/11, 23
See application file for complete search history.

(56) References Cited

U.S. PATENT DOCUMENTS

| | | | | |
|---|---|---|---|---|
| 6,754,212 B1* | 6/2004 | Terada | ................. | H04L 63/0218 370/389 |
| 8,429,751 B2* | 4/2013 | Mizrahi | .............. | H04L 63/1416 709/223 |
| 2001/0039624 A1* | 11/2001 | Kellum | ................. | G06F 21/567 726/24 |
| 2002/0013911 A1* | 1/2002 | Cordella | ............... | G06F 21/567 726/11 |
| 2002/0128981 A1* | 9/2002 | Kawan | .................... | G06Q 20/02 705/67 |
| 2004/0019564 A1* | 1/2004 | Goldthwaite | .......... | G06Q 20/04 705/44 |
| 2006/0013211 A1* | 1/2006 | Deerman | .......... | H04L 29/12009 370/389 |
| 2006/0179040 A1* | 8/2006 | Bird | ................ | G06F 17/30306 |
| 2006/0272009 A1* | 11/2006 | Stott | ................. | H04L 29/06027 726/3 |
| 2009/0248696 A1* | 10/2009 | Rowles | ................. | G06F 21/552 |
| 2009/0249484 A1* | 10/2009 | Howard | ............... | G06F 21/567 726/24 |
| 2010/0199345 A1* | 8/2010 | Nadir | ...................... | H04L 63/02 726/11 |
| 2010/0306816 A1* | 12/2010 | McGrew | ............. | H04L 63/1408 726/1 |
| 2012/0180120 A1* | 7/2012 | Jain | ..................... | H04L 63/0245 726/11 |
| 2013/0086379 A1* | 4/2013 | Shimizu | ............. | H04L 63/0485 713/160 |
| 2013/0298222 A1* | 11/2013 | Zuk | ..................... | H04L 63/0227 726/13 |
| 2013/0347085 A1* | 12/2013 | Hawthorn | ............... | G06F 21/00 726/6 |

OTHER PUBLICATIONS

Fors et al., "An Implementation of a DNS-based Malware Detection System." Nov. 2010. Karlstads University. pp. 1-35.
Non-Final Rejection for U.S. Appl. No. 14/482,986 mailed Nov. 14, 2014.
U.S. Appl. No. 14/482,986, filed Sep. 10, 2014.
Notice of Allowance for U.S. Appl. No. 14/482,986, filed Jul. 7, 2015.

* cited by examiner

*Primary Examiner* — Dao Ho
(74) *Attorney, Agent, or Firm* — Hamilton, DeSanctis & Cha LLP

(57) ABSTRACT

Methods and systems for Data Leak Prevention (DLP) in a private network are provided. According to one embodiment, information is received from an administrator (i) defining a DLP rule to be applied to packets associated with an upper layer protocol and (ii) defining an action to take when a condition associated with the rule is satisfied. The rule includes a regular expression and/or a string that is configured to detect existence of sensitive information. A packet originated by a host device is received. The packet is determined to be associated with the upper layer protocol. A command, request or method of the protocol is identified that is specified by or represented by the packet. The packet is scanned for sensitive information based on the rule. When the scanning results in a conclusion that sensitive information is contained within the packet, then the defined action is performed.

14 Claims, 6 Drawing Sheets

DATA LEAK PROTECTION IN UPPER LAYER PROTOCOLS

CROSS-REFERENCE TO RELATED APPLICATIONS

This application is a continuation of U.S. patent application Ser. No. 14/482,986, filed Sep. 10, 2014, which is hereby incorporated by reference in its entirety for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2014-2015, Fortinet, Inc.

BACKGROUND

1. Field

Embodiments of the present invention generally relate to the field of Internet communications. In particular, various embodiments relate to method and systems for data leak protection in upper layer protocols.

2. Description of the Related Art

The digitization of information stored in an organization, such as an enterprise, has increased over the years. In addition, the distribution of content via networks has also begun to grow through information infrastructures such as the Internet. The Internet speeds the communication process; however it also makes it much easier to intentionally or accidentally send corporate/personal confidential documents and/or sensitive information to an unauthorized receiver. To prevent data leak, a firewall may be deployed at a border of a private network. Multiple sensors may be configured by a network administrator of the network for defining formats of sensitive information, including, but not limited to, credit card numbers, social security numbers (SSNs), IP addresses, user names/passwords. The firewall may catch a file or a message that is sent out of the private network and then detect if the file or message contains any text that matches the formats defined by the sensors. If the file or message contains any sensitive information, the firewall may take an action defined in the sensors, such as block the message/file from transmission to its destination.

A firewall may check files or messages that are transferred via some email transfer protocols or file transfer protocols, such as post office protocol (POP), simple mail transfer protocol (SMTP), instant message access protocol (IMAP), file transfer protocol (FTP) and the like. However, when malicious software (malware), e.g., viruses, spyware, worms, trojans, rootkits, keyloggers and the like, has stolen sensitive information, e.g., credit card numbers, from a Point of Sale (POS) terminal/server, for example, such malware could use a request, command or method of an upper layer protocol that is not intended to be used to transfer messages and/or files to send the data to a hacker. For example, if malware has stolen a credit card number 8888 8888 8888 0001. The malware may send a crafted domain name system (DNS) query with "8888888888880001.com" encoded within the QNAME field of the DNS question portion of the DNS packet to a compromised DNS server. The compromised DNS server may then parse the credit card number from the DNS query and send it to the hacker.

DNS uses User Datagram Protocol (UDP) or Transmission Control Protocol (TCP) as the protocol transport to serve requests clients and issue replies. Because existing Data Leak Prevention (DLP) engines usually check only messages or files that are transferred out of a private network via specific protocols (e.g., message or file transfer protocols), the exemplary DNS query presented above, containing encoded information regarding a credit card number, will not trigger traditional DLP checking. Another way that malware may transfer the same credit card number without trigger a DLP check is by sending a hypertext transfer protocol (HTTP) GET request (HTTP://www.hacker.com/8888888888880001) to a compromised web server. The logs of the web server would then contain a record evidencing a request to access that Universal Resource Locator (URL) even though it doesn't exist. This allows hackers to bypass corporate DLP systems and gather sensitive information. A further way to bypass prior art DLP systems is by using an authentication process of an upper layer protocol. Malware may send an authentication request of an upper layer protocol and use the credit card number as a user name or password to a compromised server. The server on the other end may then log the credit card numbers that were used as usernames or passwords.

In general, malware may send sensitive information through requests, commands and/or methods of upper layer protocols that are not intended to be used to transfer messages and/or files to compromised servers. As such requests, commands and/or methods are usually used for setting up a connection with a server before a session is actually created or carrying out operations on the server side, for example, such requests, commands or/or methods will not trigger traditional DLP checking and therefore represent a risk for leaking sensitive information.

SUMMARY

Methods and systems are described for Data Leak Prevention (DLP) in a private network. According to one embodiment, a DLP method is performed by a network security appliance. Information is received from a network administrator defining a DLP rule to be applied to packets associated with an upper layer protocol and defining an action to take when one or more conditions associated with the DLP rule are satisfied. The DLP rule is defined in terms of a regular expression and/or a string that are configured to detect existence of one or more forms of sensitive information carried by the packets. A packet originated by a host device within the private network and directed to a destination device outside of the private network is received. The received packet is determined to be associated with the upper layer protocol. A command, request or method of the upper layer protocol is identified that is specified by or represented by the received packet. The received packet is scanned for sensitive information by applying the DLP rule to one or more fields of the command, request or method. The command, request or method is not designed or intended to carry data or information in a form of a message or file to a target of the command, request or method. When the scanning results in a conclusion that the sensitive information is contained within the received packet, then the defined action is performed.

Other features of embodiments of the present invention will be apparent from the accompanying drawings and from the detailed description that follows.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Figure 1:
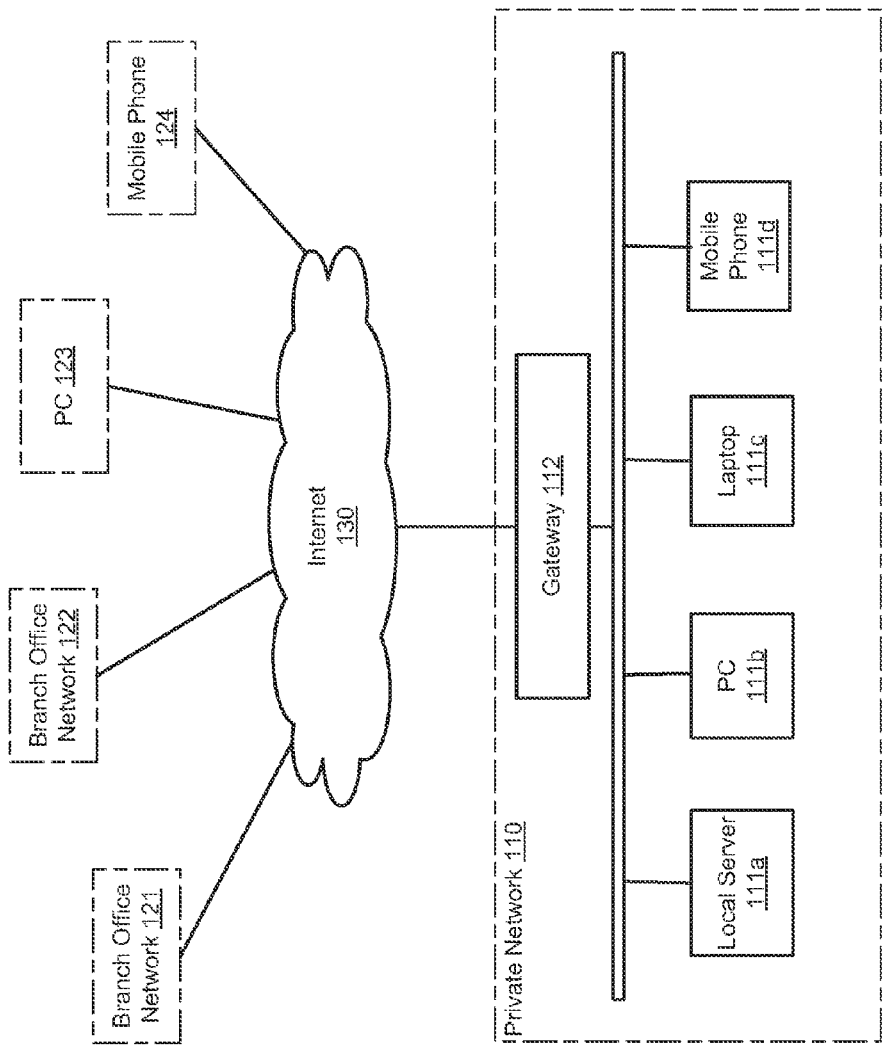
FIG. 1 is a block diagram illustrating a private network in which embodiments of the present invention may be employed.

Methods and systems are described for Data Leak Prevention (DLP) in a private network. To prevent accidental or intentional dissemination of confidential or sensitive documents and/or information to unauthorized users, it is desirable to have a DLP system that allows the transmission of such documents or information only to authorized personnel.

In the following description, numerous specific details are set forth in order to provide a thorough understanding of embodiments of the present invention. It will be apparent, however, to one skilled in the art that embodiments of the present invention may be practiced without some of these specific details. In other instances, well-known structures and devices are shown in block diagram form.

The steps may be performed by hardware components or may be embodied in machine-executable instructions, which may be used to cause a general purpose or special-purpose processor programmed with the instructions to perform the steps. Alternatively, the steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware). Moreover, embodiments of the present invention may also be downloaded as one or more computer program products, wherein the program may be transferred from a remote computer to a requesting computer by way of data signals embodied in a carrier wave or other propagation medium via a communication link (e.g., a modem or network connection).

In various embodiments, the article(s) of manufacture (e.g., the computer program products) containing the computer programming code may be used by executing the code directly from the machine-readable storage medium or by copying the code from the machine-readable storage medium into another machine-readable storage medium (e.g., a hard disk, RAM, etc.) or by transmitting the code on a network for remote execution. Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

While for sake of illustration embodiments of the present invention are described with reference to networking devices (e.g., switching devices, gateway devices and firewall security devices) available from the assignee of the present invention, it is to be understood that the methods and systems of the present invention are equally applicable to networking devices manufactured by others, including, but not limited to, Barracuda Networks, Brocade Communications Systems, Inc., CheckPoint Software Technologies Ltd., Cisco Systems, Inc., Citrix Systems, Inc., Imperva Inc., Juniper Networks, Inc., Nokia, Palo Alto Networks, SonicWall, Inc. and Syntensia AB.

TERMINOLOGY

Brief definitions of terms used throughout this application are given below.

The term "client" generally refers to an application, program, process or device in a client/server relationship that requests information or services from another program, process or device (a server) on a network. Importantly, the terms "client" and "server" are relative since an application may be a client to one application but a server to another. The term "client" also encompasses software that makes the connection between a requesting application, program, process or device to a server possible, such as an FTP client.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

The phrases "in one embodiment," "according to one embodiment," "and the like" generally mean the particular feature, structure, or characteristic following the phrase is included in at least one embodiment of the present invention, and may be included in more than one embodiment of the present invention. Importantly, such phrases do not necessarily refer to the same embodiment.

The phrase "network security appliance" generally refers to a specialized or dedicated device for use on a network in virtual or physical form that is intended to protect a network from propagating unwanted traffic or leaking sensitive information, for example. Some network security appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network security appliance include, but are not limited to, Layer 2/3 routing, content inspection, content filtering, firewall, traffic shaping, application control, Voice over Internet Protocol (VoIP) support, Virtual Private Networking (VPN), IP security (IPSec), Secure Sockets Layer (SSL), antivirus, intrusion detection, intrusion prevention, Web content filtering, spyware prevention and anti-spam. Examples of network security appliances include, but are not limited to, active devices that block unwanted traffic, including, but not limited to, firewalls, antivirus scanning devices and content filtering devices, passive devices that detect and report on unwanted traffic, including, but not limited to intrusion detection appliances, prevention devices that scan networks and identify potential security problems, including, but not limited to penetration testing and vulnerability assessment appliances and Unified Threat Management (UTM) appliances that combine features together into one system, including, firewalls, content filtering, web caching and the like. Specific examples of network appliances and network security appliances provided by the assignee include, but are not limited to network gateways (e.g., the FORTIGATE family of network security appliances and the FORTICARRIER family of consolidated security appliances), messaging security appliances (e.g., the FORTIMAIL family of messaging security appliances), database security and/or compliance appliances (e.g., the FORTIDB database security and compliance appliance), web application firewall appliances (e.g., the FORTIWEB family of web application firewall appliances), application acceleration appliances, server load balancing appliances (e.g., the FORTIBALANCER family of application delivery controllers), vulnerability management appliances (e.g., the FORTISCAN family of vulnerability management appliances), configuration, provisioning, update and/or management appliances (e.g., the FORTIMANAGER family of management appliances), logging, analyzing and/or reporting appliances (e.g., the FORTIANALYZER family of network security reporting appliances), bypass appliances (e.g., the FORTIBRIDGE family of bypass appliances), Domain Name Server (DNS) appliances (e.g., the FORTIDNS family of DNS appliances), wireless security appliances (e.g., the FORTIWIFI family of wireless security gateways), distributed denial of service (DDoS) protection appliances (e.g., the FORTIDDOS family of DDoS prevention appliances), wireless access point appliances (e.g., the FORTIAP wireless access points), switches (e.g., the FORTISWITCH family of switches) and IP-PBX phone system appliances (e.g., the FORTIVOICE family of IP-PBX phone systems).

If the specification states a component or feature "may", "can", "could", or "might" be included or have a characteristic, that particular component or feature is not required to be included or have the characteristic.

The term "server" generally refers to an application, program, process or device in a client/server relationship that responds to requests for information or services by another program, process or device (a server) on a network. The term "server" also encompasses software that makes the act of serving information or providing services possible.

The phrase "upper layer protocol" generally refers to any protocol residing in Open System Interconnection (OSI) layers five or above (e.g., the Session Layer, Presentation Layer and Application Layer). Upper layer protocols of concern in the context of the present disclosure are those that include requests, commands and/or methods not specifically designed to be used to transfer messages and/or files and which are therefore not inspected by existing DLP solutions. Such requests, commands and/or methods of upper layer protocols of concern can be misused to leak confidential or sensitive information and include, but are not limited to, requests, commands and/or methods of DNS, HTTP, FTP, Telnet, Session Initiation Protocol (SIP). Additionally, authentication requests/commands of various upper layer protocols may be misused to bypass current DLP solutions.

FIG. 1 illustrates an exemplary network architecture 100 in accordance with an embodiment of the present invention. In the context of the present example, network architecture 100 comprises a private network 110, multiple branch office networks 121 and 122. Private network 110 and branch office networks 121 and 122, PC 123 and mobile phone 124 are connected through internetworks, such as the Internet 130. Private network 110 includes multiple network appliances, such as local server 111$a$, PC 111$b$, laptop 111$c$, mobile phone 111$d$ and other computing devices that are operatively coupled to each other through a Local Area Network (LAN), wherein the LAN is then operatively coupled with gateway 112 which enables access to Internet 130. Gateway 112 separates the external computing environment, represented by Internet 130, from the internal computing environment of private network 110. Gateway 112 may intercept communications between Internet 130 and the network appliances of private network 110 and scan for malware, viruses or other high risk network accesses. The internal structures of branch office networks 121 and 122 are omitted as they may be the same as that of private network 110.

In the embodiment shown in FIG. 1, gateway 112 is an exemplary network security appliance in the form of a rule-based network security device that controls traffic going through its interfaces. Usually, gateway 112 includes multiple physical network interfaces, such as an internal interface with 4-24 or more Ethernet ports, 1-4 or more wide area network (WAN) interfaces and one demilitarized zone (DMZ) interface. Further, when the private network is separated into multiple virtual LANs (VLANs), gateway 112 may also define multiple virtual interfaces for each of the VLANs.

Gateway 112 includes a rule set with multiple rules created by the network administrator and controls the traffic going through gateway 112. In the context of each rule, traffic is typically identified by source interfaces, destination interfaces, source Internet Protocol (IP) addresses, destination IP addresses, users/user groups, devices and other parameters of the traffic. In one embodiment of the present invention, multiple interfaces of gateway 112 may be selected as the source/destination of traffic in a single rule. The multiple interfaces can include physical interfaces, virtual interfaces or zones of gateway 112. Usually, multiple interfaces that belong to the same category may be selected as a source in a rule. For example, multiple VLAN interfaces may be selected as sources/destinations of the traffic in a rule. However, different categories of interfaces may also be allowed as sources/destinations of a traffic flow in a rule. For example, an internal interface and a WAN interface or a physical interface and a virtual interface may be selected in a rule as the sources/destinations of traffic. In this scenario, a warning message may be provided to the network administrator before the rule containing multiple categories of interfaces can be stored within gateway 112. After the traffic flow is defined, an action controlling the traffic flow, such as accept or deny, is designated in each rule. In operation, all traffic going through interfaces of gateway 112 is captured by gateway 112. The source interface, destination interface and other parameters of the captured traffic flow are matched with those of each rule of a rule set. The first matched rule in the rule set is typically used for controlling the traffic flow and the traffic flow is processed based on the action defined in the matched rule.

In addition to traffic rules, the network administrator of gateway 112 may also configure DLP sensors at the gateway 104. The DLP sensors are modules that are capable of detecting sensitive information contained in requests or commands of upper layer protocols. The network administrator may log into the gateway 112 and configure the DLP sensors to detect particular requests or commands and responsive to the detection perform specified actions. The actions may include either blocking or passing the requests/commands at the gateway 112, when the requests/commands containing the particular sensitive information are received by (attempted to be transferred through) the gateway 112.

In an exemplary embodiment of the present invention, gateway 112 may be a FORTIGATE gateway available from Fortinet, Inc. of Sunnyvale, Calif. (FORTIGATE is a trademark or registered trademark of Fortinet, Inc.).

Figure 2:
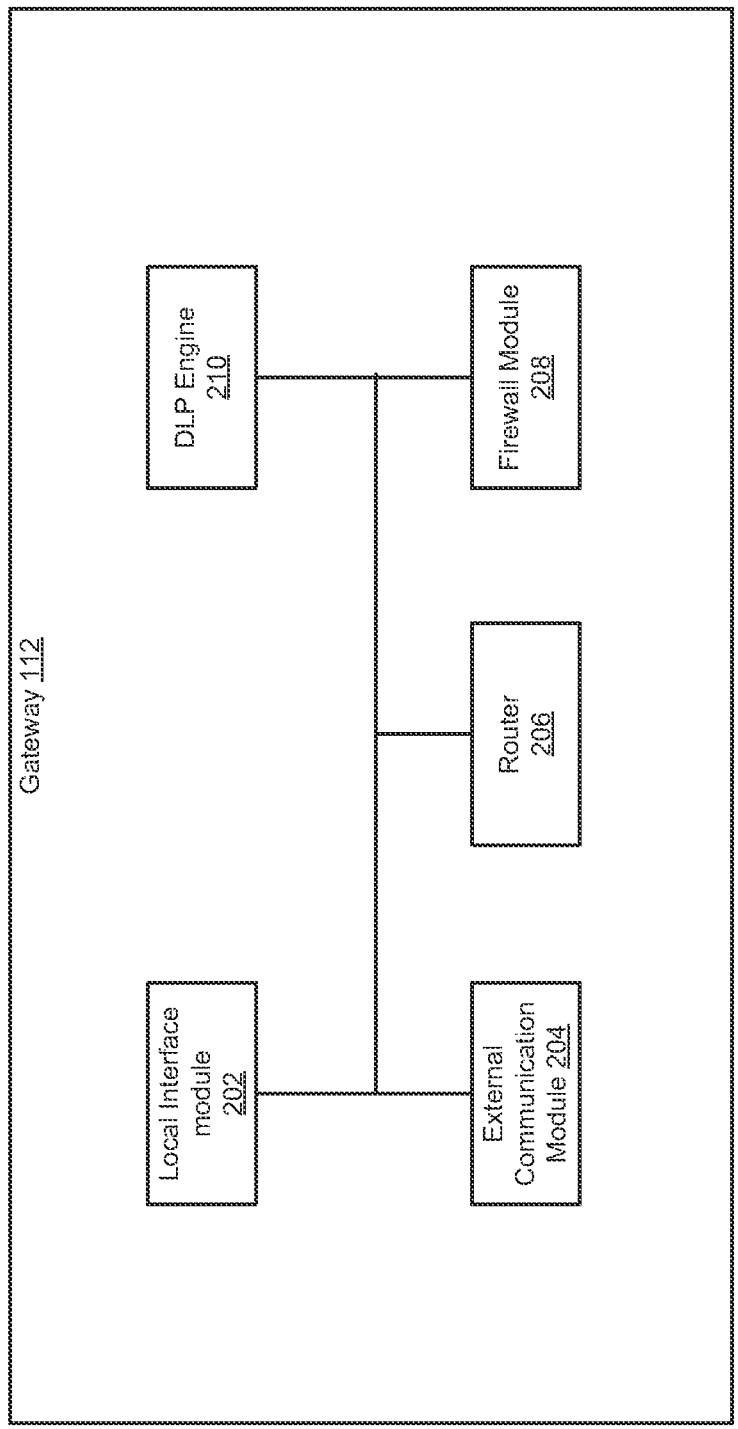
FIG. 2 is a block diagram conceptually illustrating interaction among various functional units of a gateway in accordance with an embodiment of the present invention.

FIG. 2 is a block diagram conceptually illustrating interaction among various functional units of gateway 112, in accordance with an embodiment of the present invention. In the context of the present example, gateway 112 includes a local interface module 202, an external communications module 204, a router 206, a firewall module 208 and a DLP engine 210.

According to one embodiment, local interface module 202 provides a physical and data-link layer communication interface with one or more computer systems, such as computer systems 111a-d. Local interface module 202 accepts and provides IP packets over an internal data path and interfaces with the network link. External interface module 204 accepts and provides IP packets over data paths from and to other modules in gateway 112, and provides physical and data-link layer interfaces to a communication link that couples gateway 112 to the external network.

Further, external communication module 204 is coupled to router 206. Router 206 accepts IP packet from a number of data paths within gateway 112, and routes those packets to other data paths. For example, router 206 accepts IP packets over a data path from local interface module 202. Furthermore, router 206 is connected to firewall module 208. Firewall module 208 adds a level of protection between computer systems 111a-d, and permits or denies network transmissions based upon a set of rules. The rules are run and the outcome is then communicated by firewall module 208 to external communications module 204 and an action is taken accordingly.

Gateway 112 further comprises a DLP engine 210. In an embodiment, DLP engine 210 is capable of detecting sensitive information in requests/commands of upper layer protocols that are not scanned by existing DLP solutions. DLP engine 210 detects sensitive information (e.g., payment card numbers, usernames/passwords, IP addresses, or particular words/phrases) contained in a request or a command of an upper layer protocol that a client intends to send out of the network. In another embodiment, DLP engine 210 is capable of analyzing a particular field of a request that a client intends to send out of the network. In addition to analyzing/scanning upper layer protocols of particular concern or those specifically configured by the network administrator, DLP engine 210 may also analyze/scan network traffic, such as customarily analyzed/scanned by existing DLP solutions.

According to an embodiment, DLP engine 210 includes a package of DLP rules or sensors. Traffic passing through gateway 112 is searched for patterns defined by the DLP sensors (rules). Based on the matching and how the DLP rules are defined, an appropriate action may be taken on the traffic, such as blocking the traffic at gateway 112, allowing the traffic to pass through gateway 112, logging the traffic and/or the like.

According to various embodiments of the present invention, the functional modules can be any suitable type of logic (e.g., digital logic) for executing the operations described herein. Any of the functional modules used in conjunction with embodiments of the present invention can include machine-readable media including instructions for performing operations described herein. Machine-readable media include any mechanism that provides (i.e., stores and/or transmits) information in a form readable by a machine (e.g., a computer). For example, a machine-readable medium includes read only memory (ROM), random access memory (RAM), magnetic disk storage media, optical storage media, flash memory devices, electrical, optical, acoustical or other forms of propagated signals (e.g., carrier waves, infrared signals, digital signals, etc.), etc.

Figure 3:
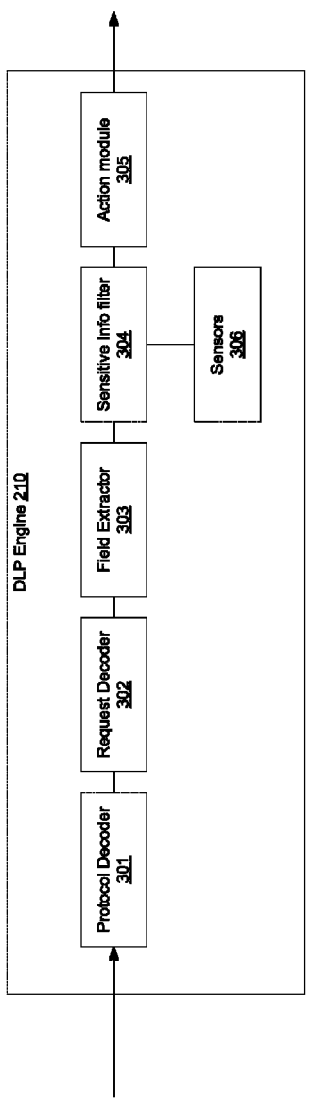
FIG. 3 is a block diagram conceptually illustrating interaction among various functional units of a DLP engine in accordance with an embodiment of the present invention.

FIG. 3 is a block diagram conceptually illustrating interactions among various functional units of a DLP engine 210 in accordance with an embodiment of the present invention. In the present embodiment, DLP engine 210 may identify an upper layer protocol used by a data packet that is intended to be sent out of a private network. DLP engine 210 may further identify a request or a command of the upper layer protocol that a client intends to send to a server. If a field of the request or command has enough space for transmission of sensitive information, DLP engine 210 will be triggered to scan for sensitive information contained within the request or the field although the request, command or method at issue may not have been specifically designed or intended for transferring, uploading or otherwise conveying a message or a file.

In the context of the present example, DLP engine 210 includes a protocol decoder 301, a request decoder 302, a field extractor 303, a sensitive information filter 304, an action module 305 and sensors 306. After a data packet that a client intends to send out of a private network is received by a gateway, such as gateway 112, the data packet is then sent to DLP engine 210 for data leak scanning/analysis.

The data packet is analyzed by protocol decoder 301 to identify an upper layer protocol with which the data packet is associated. In one embodiment, the upper layer protocol may include any protocol residing in OSI layers five or above. The protocol of the data packet may be determined by the destination port of the data packet. For example, if the destination port is 53, the upper layer protocol of the data packet may be determined to be the DNS protocol. If the destination port is 21, the upper layer protocol of the data packet may be determined to be FTP.

Next, request decoder 302 further determines a request or a command of the upper layer protocol specified by the data packet based on the previous identification of the upper layer protocol. Generally, each upper layer protocol includes a set of request/response messages that are exchanged between a client and a server. Some requests or commands of protocols that are associated with electronic mail (email)/file/instant message transmissions are currently checked by prior art DLP systems. However, other requests or commands of upper layer protocols that contain one or more parameters that are used for operations other than transferring messages or files may be utilized by malware to transfer sensitive information to a compromised server. For example, a DNS query that contains a payment card number may be sent by malware to a compromised DNS server. The compromised server may parse the DNS query and collect the payment card number. In this manner, a hacker that controls the DNS server may bypass traditional scanning by existing DLP systems and gather the payment card number through a DNS query which looks like a normal query, but encodes a payment card number within one or more fields of a DNS protocol command, request or method.

Another example of a request that may be used to carry sensitive information is an authentication request sent from a client to a compromised server. Many upper layer protocols have a user authentication procedure before a session may be established between a client and a server. During such user authentication procedures, a user-id and password may be sent by a client through an authentication request defined in an upper layer protocol. The malware may send a crafted authentication request to a server, wherein the user-id or password field of the authentication request contains a payment card number, for example. After the compromised server receives the crafted authentication request, the authentication request may be logged by the server regardless of whether it is accepted. Then, the payment card number may be parsed from the log by the hacker who controls the server. In this scenario, the hacker may transfer the sensitive information without establishing a session or connection between the client and server.

Further examples of requests that may be used for data leakage are FTP control commands that are sent from an FTP client to an FTP server, including, but not limited to, a make a directory command, a download command and an upload command. Data leak scanning by existing DLP systems will not be triggered by such FTP control commands because the these commands were designed/intended for a purpose other than sending data or information in the form of a message or a file to the server.

Additional examples of requests that may be used for data leakage are telnet protocol commands. Some telnet commands contain one or more parameters that may be crafted to contain sensitive information.

In order to prevent data leakage through requests or commands that are not specifically designed or intended to carrying messages or files, the request or command contained in the data packet may be identified by request decoder 302 for data leak checking/scanning/analysis.

Next, a field extractor 303 may be used for parsing one or more fields of the request or command that are identified by request decoder 302. In network communication, each request or command has a format that is defined by the corresponding protocol. The request or command may contain a header and a data portion. The header and data portion may have multiple fields that may have a fixed or variable length. Based on each protocol, requests or commands that have or do not have enough space to carry sensitive information and requests or commands that have fields that may be utilized for data leakage may be identified. Therefore, field extractor 303 may extract one or more fields that may contain enough space for hiding sensitive information from a request based on the corresponding protocol of the data packet. For example, a DNS packet may be parsed based on various Requests for Comments (RFCs), for example, defining the DNS protocol. Table 1 shows the structure of a DNS query message header.

TABLE 1

| 0 | 1 | 2 | 3 | 4 | 5 | 6 | 7 | 8 | 9 | 10 | 11 | 12 | 13 | 14 | 15 |
|---|---|---|---|---|---|---|---|---|---|----|----|----|----|----|----|
| Message ID |||||||||||||||||
| QR || OPCODE |||| AA | TC | RD | RA | res1 | res2 | res3 | RCODE ||||
| QDCOUNT (No. of items in Question Section) ||||||||||||||||
| ANCOUNT (No. of items in Answer Section) ||||||||||||||||
| NSCOUNT (No. of items in Authority Section) ||||||||||||||||
| ARCOUNT (No. of items in Additional Section) ||||||||||||||||

Table 2 shows the structure of a DNS question section.

TABLE 2

| Field Name | Meaning/Use |
|---|---|
| QNAME | The domain name being queried |
| QTYPE | The resource records being requested |
| QCLASS | The Resource Record(s) class being requested e.g. internet, chaos etc. |

As shown in Table 2, the QNAME field of the DNS query request may have enough space for carrying sensitive information. Therefore, in one embodiment, the QNAME field of a DNS query request is extracted for data leak scanning use of the DNS protocol is detected.

Next, the field that is extracted by field extractor 303 or the whole request that is identified by request decoder 302 may be scanned by sensitive information filter 304 based on sensors 306. According to one embodiment, each sensor of sensors 306 is defined by the network administrator of the gateway and may include a regular expression of the sensitive information or a string that should be matched in the content of the requests or command. The following are exemplary regular expressions that may be used to identify the existence of a credit card number or a social security number within a field:

Visa Credit Card Numbers:
^4[0-9]{12}(?:[0-9]{3})?$
Master Card Credit Card Numbers:
^5[1-5][0-9]{14}$
Social Security Number (SSN):
^([[:digit:]] {3}[-][[:digit:]]{2}[-][[:digit:]]{4}|[[:digit:]] {9})$ Each sensor may also include or otherwise be associated with an action that should be applied to the traffic if the string or regular expression is matched. The different actions may be defined based on the sensitivity levels of the data. For the most sensitive data leak, the traffic may be blocked. Other actions, such as logging or passing the data traffic may be taken for less sensitive data. The action may be applied by action module 305 when a sensor is matched. In other embodiments of the present invention, one or more additional or alternative data identification methodologies (predefined or defined or configurable by the network administrator) may be used in place of or to supplement regular expressions including, but not limited to, content registration, contextual analysis, keywords, lexicons, extended regular expressions, meta data tags, Bayesian analysis, statistical analysis, machine learning and the like.

Figure 4:
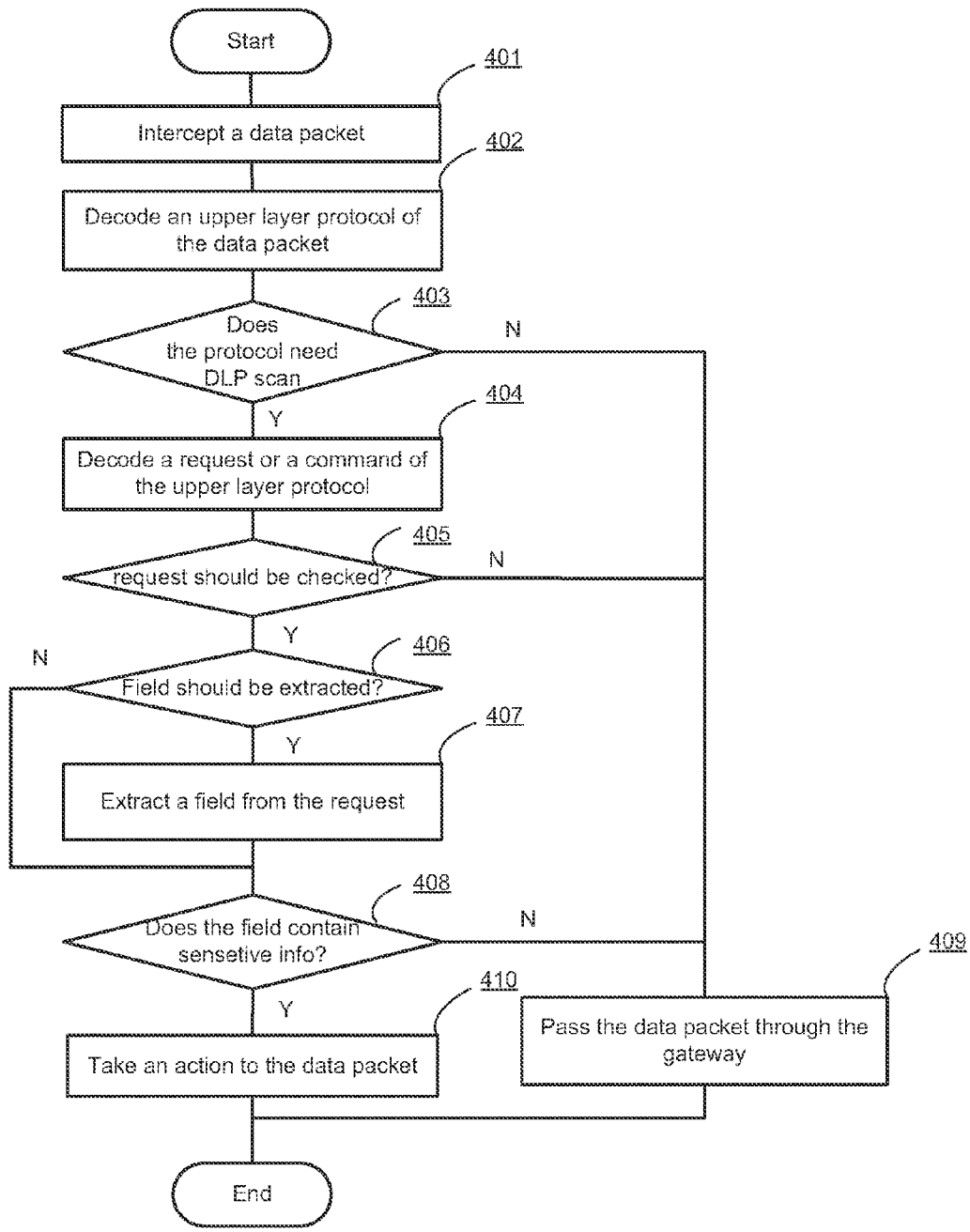
FIG. 4 is a flow diagram illustrating a method for DLP in a private network in accordance with an embodiment of the present invention.

FIG. 4 is a flow diagram illustrating a method for Data Leak Prevention (DLP) in a private network in accordance with an embodiment of the present invention. Depending upon the particular implementation, the various process and decision blocks described below may be performed by hardware components, embodied in machine-executable instructions, which may be used to cause a general-purpose or special-purpose processor programmed with the instructions to perform the steps, or the steps may be performed by a combination of hardware, software, firmware and/or involvement of human participation/interaction.

At block 401, a data packet is received by a gateway, such as gateway 112 shown in FIGS. 1 and 2.

At block 402, the data packet is decoded by a DLP engine of the gateway to identify an upper layer protocol that the data packet is using. The protocol may be determined based on the destination port of the data packet. Alternatively or additionally, information contained in the protocol field of the IP packet may be considered.

At block 403, the DLP engine may determine if the protocol should be checked for potential data leakage. In one embodiment, the network administrator of the gateway may configure a rule that defines a list of those of the upper layer protocols that should be checked. For example, a list of candidate protocols may be provided via a control panel user interface and the network administrator may select those of the listed protocols that are to be subjected to DLP scanning. If the protocol is not among those to be checked for data leakage, processing continues with block 409 and the gateway may pass the data packet. If the protocol is determined to be among those to be checked for data leakage, processing branches to block 404.

At block 404, the data packet is further decoded to identify one or more requests or commands of the upper layer protocol that are specified by the data packet. The requests/commands may be decoded based on defined message structures associated with the corresponding protocol. A non-limiting example of preventing data leakage through a DNS query request is described in detail below with reference to FIG. 5.

At block 405, the gateway may determine if the identified requests or commands should be scanned for data leakage. Usually, a few requests/commands of a protocol may contain parameters or fields that have enough space for carrying sensitive information although these requests/commands are not designed for transmission of messages or files. The gateway may maintain a list of these requests/commands for each upper layer protocol. The list may be predefined or configurable by the network administrator through a control panel interface, for example. Table 3 provides a non-limiting list of exemplary requests/commands that are not specifically defined for transmission of messages or files but which may nonetheless be misused by malware to send sensitive information out of a network.

TABLE 3

| Protocol | Request/command | Field |
| --- | --- | --- |
| Any | Authentication | User-ID/Password |
| DNS | DNS query | QNAME |
| FTP | MD | directory |
| FTP | GET | File Name |
| FTP | PUT | File Name |
| HTTP | GET | URL |
| SIP | INVITE | VIA |
| SIP | INVITE | FROM |
| SIP | INVITE | CALL-ID |
| . . . | | |

If the request/command does not need to be checked, processing branches to block 409 and the data packet is allowed to pass through the gateway. If the request should be checked, processing continues with block 406.

At block 406, the gateway may determine if one or more particular fields of the request/command should be extracted for data leak scanning. In one embodiment, the whole data packet or the whole request/command may be scanned for data leakage. For example, if the request is unencrypted or the DLP system does not need to know which field of the request is utilized by the malware to convey sensitive or confidential information, processing continues with block 408 and the entire data packet may be scanned to identify potential data leakage. It is also possible that the entire data packet or request is scanned first. If a data leakage is found in the data packet, then, the field of the request in which sensitive information is found may be extracted and reported to the network administrator. In another embodiment, the gateway may run in a deep scan mode where a particular field that is not specifically designed for transmission of a message or a file but is capable of carrying sensitive information is extracted for data leak scanning. A non-limiting list of exemplary fields is listed in Table 3.

At block 407, one or more particular fields that may be utilized for carrying sensitive information may be extracted from the request/command by a protocol parser based on the data structure defined by the associated protocol. The particular fields may include, but is not limited to, the fields listed in Table 3 and a dedicated protocol parser may be used for analyzing the data packet and extracting one or more particular fields of a request/command of an upper layer protocol. In some embodiments, if the data packet at issue is encrypted, it may be decrypted by a decryption unit before extracting the field. For example, if the request is secured with secure sockets layer (SSL), the data packet may be first decrypted by an SSL proxy. Then, the decrypted data packet may be processed to identify the request/command of the data packet and a particular field may be extracted from the decrypted data packet.

At block 408, the request/command or a particular field of the request is scanned by the DLP engine for any sensitive information. Key words or regular expressions of sensitive information may be defined and stored in sensors of the gateway by the network administrator. The DLP engine may detect data leak by matching the request or a field of the request with key words or regular expressions of the sensors. One or more additional or alternative data identification methodologies (predefined or defined or configurable by the network administrator) may be used in place of or to supplement regular expressions and key words including, but not limited to, content registration, contextual analysis, lexicons, extended regular expressions, meta data tags, Bayesian analysis, statistical analysis, machine learning and the like. If no match is found by the DLP engine (meaning no sensitive or confidential information has been identified to be contained within the data packet at issue), the data packet is passed by the gateway at block 409. If a match is found in the request (meaning sensitive or confidential information has been identified to be contained within the data packet at issue), an action associated with the corresponding sensor by the network administrator is taken by the gateway. For example, the data packet may be dropped or a warning message identifying the detected data leakage may be sent to the network administrator. Additionally or alternatively, an event and/or the data packet or a portion thereof may be recorded in a log for further inspection.

Figure 5:
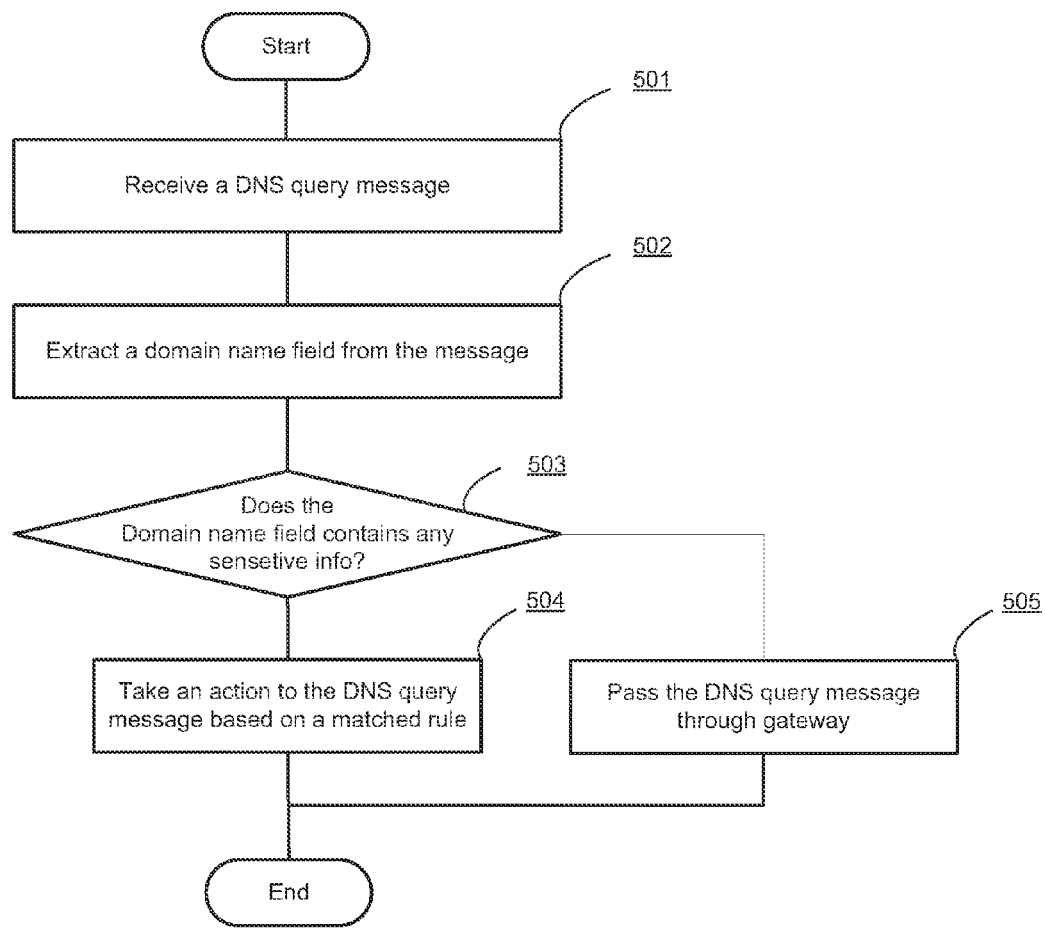
FIG. 5 is a flow diagram illustrating a method for DLP in a private network in accordance with another embodiment of the present invention.

FIG. 5 is a flow diagram illustrating a method for Data Leak Prevention (DLP) in a private network in accordance with another embodiment of the present invention. In this embodiment, a DNS query request is scanned in order to prevent sensitive information from being sent to a compromised DNS server through a DNS query.

At block 501, a DNS query request is received by a DLP engine of a gateway. The request is sent by a DNS client within a private network to a DNS server that is outside the private network. A DNS query request may include one or more domain names for which IP addresses are being queried. As noted in the Background, malware may encode sensitive or confidential information in a form that would otherwise appear to be a valid domain name format, such as 8888-8888-8888-0001.com, 111-11-1111.com, passsword.user-id.com or user-id.password.com. Although such a domain name may not be translated to an IP address by the DNS server, the sensitive information may be logged or parsed by a compromised DNS server.

At block 502, a protocol parser of the DLP engine may extract one or more domain name strings contained in the QNAME field of the DNS query request.

At block 503, the domain name strings may be matched with sensors configured by a network administrator, for example, to check if any sensitive information is contained therein.

At block 504, if sensitive information is found in the domain name strings, an action associated with the matched sensor is taken so that data leakage through the DNS query request may be prevented and/or brought to the attention of the network administrator.

At block 505, if sensitive information is not found, the DNS query request is passed through the gateway.

Figure 6:
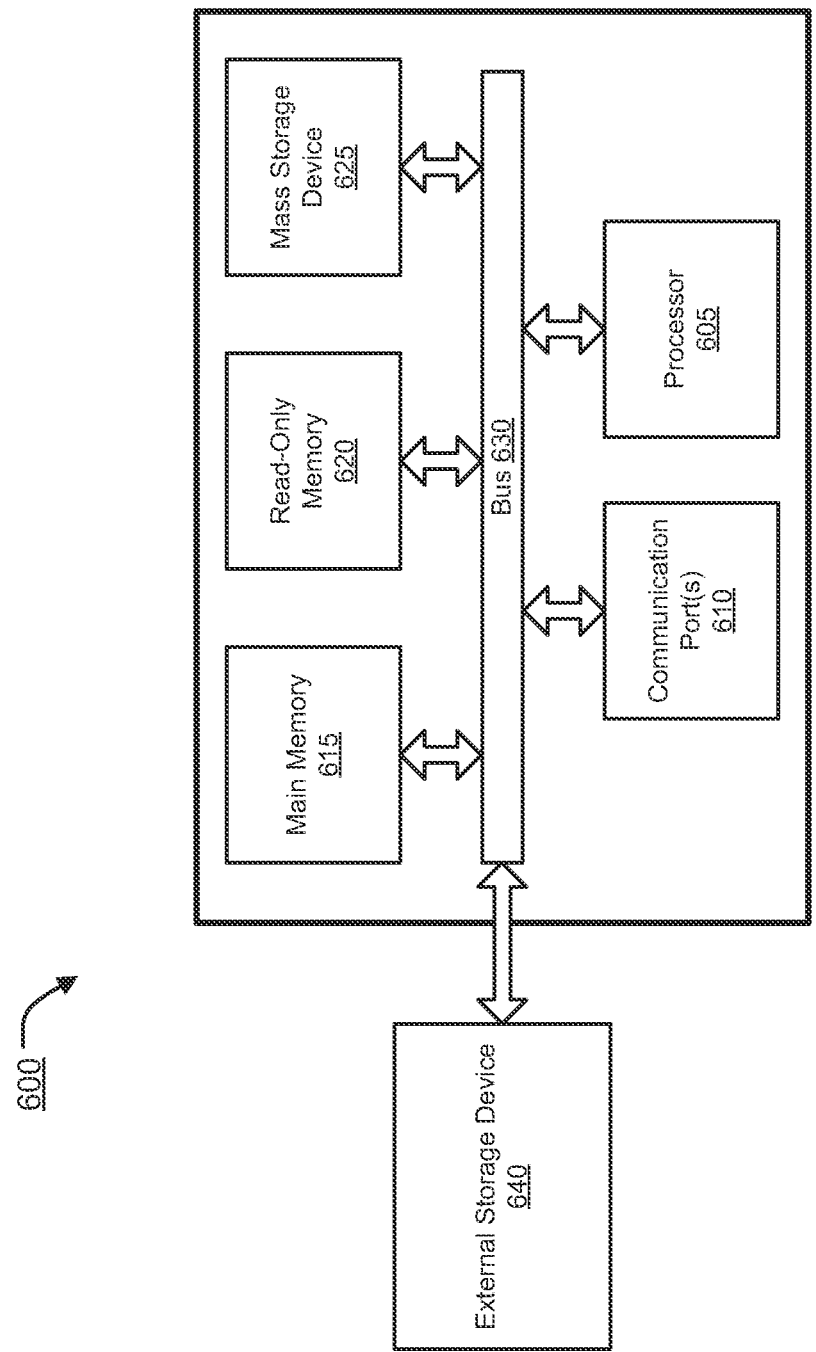
FIG. 6 is an exemplary computer system with which embodiments of the present invention may be utilized.

FIG. 6 is an example of a computer system 600 with which embodiments of the present disclosure may be utilized. Computer system 600 may represent or form a part of a network security appliance, a server or a client workstation.

Embodiments of the present disclosure include various steps, which will be described in more detail below. A variety of these steps may be performed by hardware components or may be tangibly embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware.

As shown, computer system 600 includes a bus 630, a processor 605, communication port 610, a main memory 615, a removable storage media 640, a read only memory 620 and a mass storage 625. A person skilled in the art will appreciate that computer system 600 may include more than one processor and communication ports.

Examples of processor 605 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 605 may include various modules associated with embodiments of the present invention.

Communication port 610 can be any of an RS-232 port for use with a modem based dialup connection, a 10/100 Ethernet port, a Gigabit or 10 Gigabit port using copper or fiber, a serial port, a parallel port, or other existing or future ports. Communication port 610 may be chosen depending on a network, such a Local Area Network (LAN), Wide Area Network (WAN), or any network to which computer system 600 connects.

Memory 615 can be Random Access Memory (RAM), or any other dynamic storage device commonly known in the art. Read only memory 620 can be any static storage device(s) such as, but not limited to, a Programmable Read Only Memory (PROM) chips for storing static information such as start-up or BIOS instructions for processor 605.

Mass storage 625 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), such as those available from Seagate (e.g., the Seagate Barracuda 7200 family) or Hitachi (e.g., the Hitachi Deskstar 7K1000), one or more optical discs, Redundant Array of Independent Disks (RAID) storage, such as an array of disks (e.g., SATA arrays), available from various vendors including Dot Hill Systems Corp., LaCie, Nexsan Technologies, Inc. and Enhance Technology, Inc.

Bus 630 communicatively couples processor(s) 605 with the other memory, storage and communication blocks. Bus 630 can be, such as a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 605 to system memory.

Optionally, operator and administrative interfaces, such as a display, keyboard, and a cursor control device, may also be coupled to bus 630 to support direct operator interaction with computer system 600. Other operator and administrative interfaces can be provided through network connections connected through communication port 610.

Removable storage media 640 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM).

Components described above are meant only to exemplify various possibilities. In no way should the aforementioned exemplary computer system limit the scope of the present disclosure.

While embodiments of the present invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claims.

What is claimed is:

1. A data leak prevention (DLP) method comprising:
receiving from a network administrator, by a network security appliance within a private network, (i) information defining a DLP rule to be applied by the network security appliance to packets associated with an upper layer protocol and (ii) information defining an action to take when one or more conditions associated with the DLP rule are satisfied, wherein the packets are originated within the private network and addressed to a destination residing outside of the private network and wherein the DLP rule is defined in terms of one or more of a regular expression and a string that are configured to detect existence of one or more forms of sensitive information carried by the packets;

receiving, by the network security appliance, a packet originated by a host device within the private network and directed to a destination device outside of the private network;

determining, by the network security appliance, the received packet is associated with the upper layer protocol;

identifying, by the network security appliance, a command, request or method of the upper layer protocol that is specified by or represented by the received packet;

scanning, by the network security appliance, the received packet for sensitive information by applying the DLP rule to one or more fields of the command, request or method, wherein the command, request or method is not designed or intended to carry data or information in a form of a message or file to a target of the command, request or method;

when the scanning results in a conclusion that the sensitive information is contained within the received packet, then performing, by the network security appliance, the defined action;

wherein the one or more forms of sensitive information comprise a payment card number or a social security number;

wherein the regular expression detects a format and type of content corresponding to a credit card number associated with a particular payment processing provider or the social security number; and wherein the regular expression comprises:
^4[0-9]{12}(?:[0-9]{3})?$;
^5[1-5][0-9]{14}$; or
^([[:digit:]]{3}[-][[:digit:]]{2}[[:digit:]]{4}|[[:digit:]]{9})$.

2. The method of claim 1, wherein the upper layer protocol comprises domain name system (DNS) protocol, wherein the command, request or method comprises a DNS query request and wherein the one or more fields comprise a name field of the DNS query request.

3. The method of claim 1, wherein the command, request or method comprises an authentication request and the one or more fields comprise a user name or password field of the authentication request.

4. The method of claim 1, wherein the upper layer protocol comprises hypertext transfer protocol (HTTP), wherein the command, request or method comprises an HTTP GET method and the one or more fields comprise a uniform resource identifier (URI) of the HTTP GET method.

5. The method of claim 1, wherein the upper layer protocol comprises file transfer protocol (FTP), wherein the command, request or method comprises an FTP command associated with directory operation and wherein the one or more fields comprise a directory field of the FTP command.

6. The method of claim 1, wherein the upper layer protocol comprises file transfer protocol (FTP), wherein the command, request or method comprises an FTP command associated with a file download or a file upload operation and wherein the one or more fields comprise a file name field of the FTP command.

7. The method of claim 1, wherein the upper layer protocol comprises telnet protocol, wherein the command, request or method comprises a telnet command having at least one parameter and wherein the one or more fields comprise the at least one parameter.

8. A non-transitory program storage device readable by a network security appliance, tangibly embodying a program of instructions executable by one or more computer processors of the network security appliance to perform a method of data leak prevention (DLP), the method comprising:

receiving from a network administrator (i) information defining a DLP rule to be applied by the network security appliance to packets associated with an upper layer protocol and (ii) information defining an action to take when one or more conditions associated with the DLP rule are satisfied, wherein the packets are originated within a private network protected by the network security appliance and addressed to a destination residing outside of the private network and wherein the DLP rule is defined in terms of one or more of a regular expression and a string that are configured to detect existence of one or more forms of sensitive information carried by the packets;

receiving a packet originated by a host device within the private network and directed to a destination device outside of the private network;

determining the received packet is associated with the upper layer protocol;

identifying a command, request or method of the upper layer protocol that is specified by or represented by the received packet;

scanning the received packet for sensitive information by applying the DLP rule to one or more fields of the command, request or method, wherein the command, request or method is not designed or intended to carry data or information in a form of a message or file to a target of the command, request or method;

when the scanning results in a conclusion that the sensitive information is contained within the received packet, then performing the defined action;

wherein the one or more forms of sensitive information comprise a payment card number or a social security number;

wherein the regular expression detects a format and type of content corresponding to a credit card number associated with a particular payment processing provider or the social security number; and wherein the regular expression comprises:
^4[0-9]{12}(?:[0-9]{3})?$;
^5[1-5][0-9]{14}$; or
^([[:digit:]]{3}[-][[:digit:]]{2}[-][[:digit:]]{4}|[[:digit:]]{9})$.

9. The non-transitory program storage device of claim 8, wherein the upper layer protocol comprises domain name system (DNS) protocol, wherein the command, request or method comprises a DNS query request and wherein the one or more fields comprise a name field of the DNS query request.

10. The non-transitory program storage device of claim 8, wherein the command, request or method comprises an authentication request and the one or more fields comprise a user name or password field of the authentication request.

11. The non-transitory program storage device of claim 8, wherein the upper layer protocol comprises hypertext transfer protocol (HTTP), wherein the command, request or method comprises an HTTP GET method and the one or more fields comprise a uniform resource identifier (URI) of the HTTP GET method.

12. The non-transitory program storage device of claim 8, wherein the upper layer protocol comprises file transfer protocol (FTP), wherein the command, request or method comprises an FTP command associated with directory operation and wherein the one or more fields comprise a directory field of the FTP command.

13. The non-transitory program storage device of claim 8, wherein the upper layer protocol comprises file transfer protocol (FTP), wherein the command, request or method comprises an FTP command associated with a file download or a file upload operation and wherein the one or more fields comprise a file name field of the FTP command.

14. The non-transitory program storage device of claim 8, wherein the upper layer protocol comprises telnet protocol, wherein the command, request or method comprises a telnet command having at least one parameter and wherein the one or more fields comprise the at least one parameter.

* * * * *